(12) United States Patent
Thomas et al.

(10) Patent No.: US 10,948,007 B2
(45) Date of Patent: Mar. 16, 2021

(54) TORQUE TRANSMITTING SHAFT

(71) Applicant: STEERING SOLUTIONS IP HOLDING CORPORATION, Saginaw, MI (US)

(72) Inventors: Steven M. Thomas, Saginaw, MI (US); Jon N. Miller, Merrill, MI (US); Eduardo R. Mondragon-Parra, Freeland, MI (US); Brian J. Kleinfeld, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 281 days.

(21) Appl. No.: 15/923,993

(22) Filed: Mar. 16, 2018

(65) Prior Publication Data

US 2018/0202486 A1 Jul. 19, 2018

Related U.S. Application Data

(62) Division of application No. 14/933,639, filed on Nov. 5, 2015, now Pat. No. 9,945,415.

(60) Provisional application No. 62/075,498, filed on Nov. 5, 2014.

(51) Int. Cl.
*F16C 3/02* (2006.01)

(52) U.S. Cl.
CPC .................... *F16C 3/023* (2013.01)

(58) Field of Classification Search
CPC ...................................... F16C 3/023
USPC ........................................... 464/97
See application file for complete search history.

(56) References Cited

U.S. PATENT DOCUMENTS

| | | | |
|---|---|---|---|
| 2,590,169 A | 3/1952 | Fritz | |
| 2,703,847 A | 3/1955 | Kalikow | |
| 2,734,359 A | 2/1956 | Mulheim et al. | |
| 3,667,214 A | 6/1972 | Addie | |
| 4,754,659 A | 7/1988 | Rietsch | |
| 9,416,815 B2 | 8/2016 | Grimmer et al. | |
| 2011/0209961 A1 | 9/2011 | Yamamoto et al. | |
| 2016/0146245 A1 | 5/2016 | Thomas et al. | |

FOREIGN PATENT DOCUMENTS

| | | |
|---|---|---|
| CN | 1039473 A | 2/1990 |
| CN | 1894512 A | 1/2007 |
| DE | 102012223674 A1 | 3/2014 |

(Continued)

OTHER PUBLICATIONS

English Translation of Chinese Office Action and Search Report for Chinese Application No. 201510793993.7 dated Sep. 29, 2017, 11 pages.

(Continued)

*Primary Examiner* — Greg Binda
(74) *Attorney, Agent, or Firm* — Dickinson Wright PLLC

(57) ABSTRACT

A torque transmitting shaft includes a first member and a second member. The first member extends along an axis and has an inner surface extending between a first end and a second end. The inner surface defines a plurality of first engagement elements disposed proximate the first end. The second member extends along the second axis and has a first end portion and an intermediate portion extending from the first end portion. The first end portion has a first spline portion and each member of the first spline portion is received within corresponding engagement elements of the plurality of first engagement elements.

2 Claims, 8 Drawing Sheets

(56) References Cited

FOREIGN PATENT DOCUMENTS

GB          2070194 A    9/1981
JP        2014213680 A   11/2014

OTHER PUBLICATIONS

European Extended Search Report for EP Application No. 15193237.3 dated Mar. 30, 2016.
Chinese Office Action and Search Report for Chinese Application No. 201510793993.7 dated Jun. 14, 2018, 7 pages.
English Translation of Chinese Office Action and Search Report for Chinese Application No. 201510793993.7 dated Jun. 14, 2018, 11 pages.

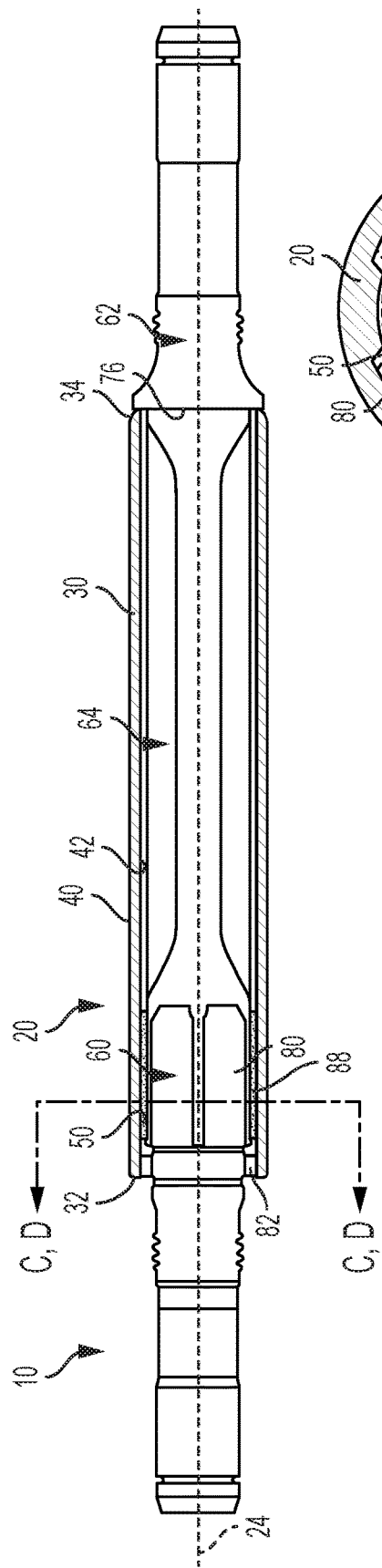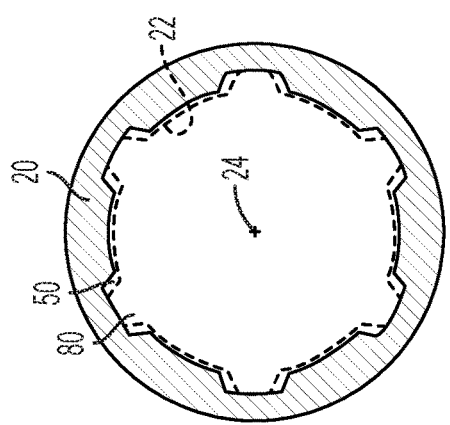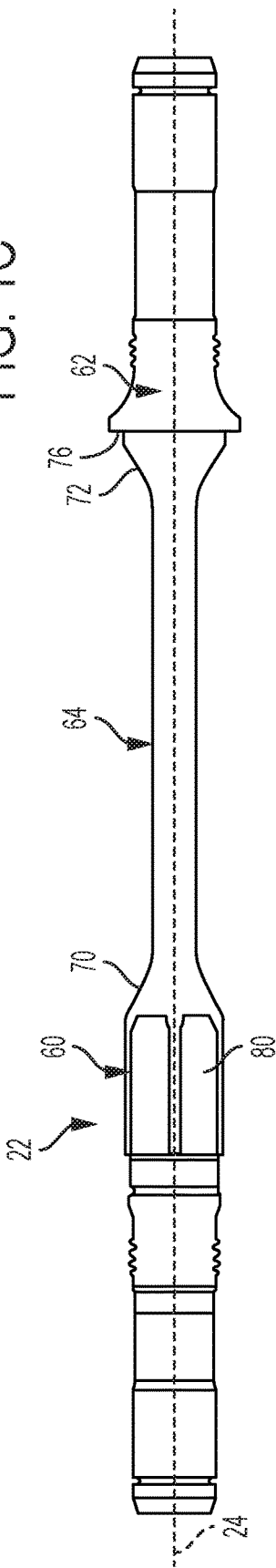

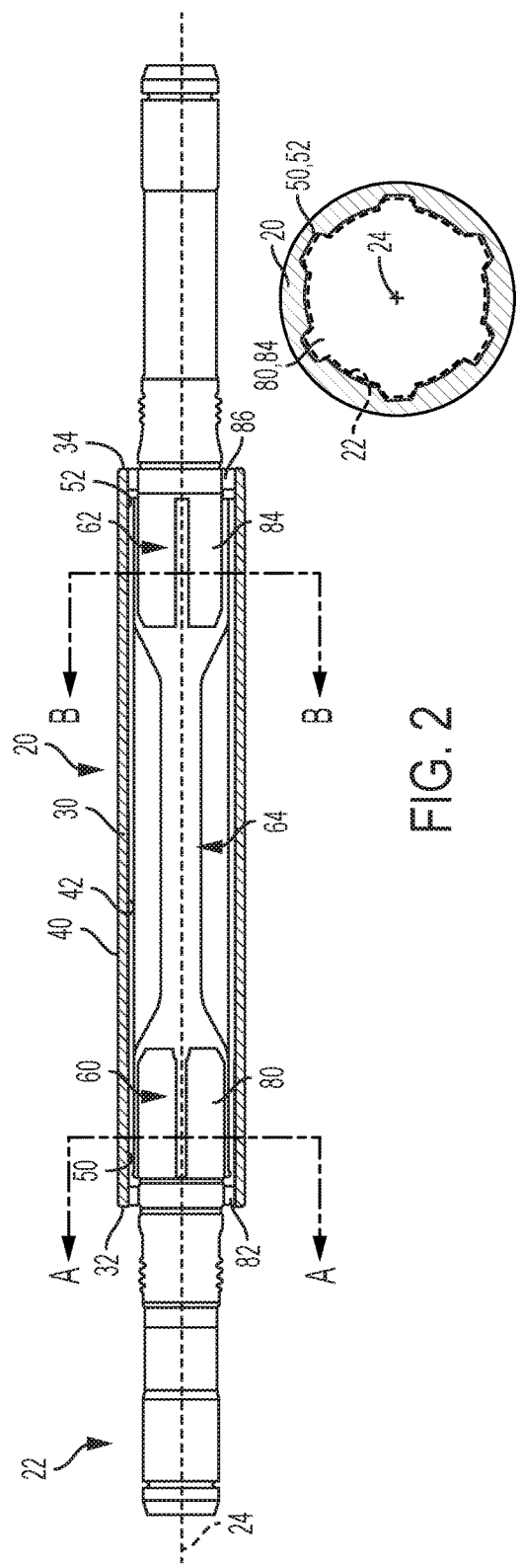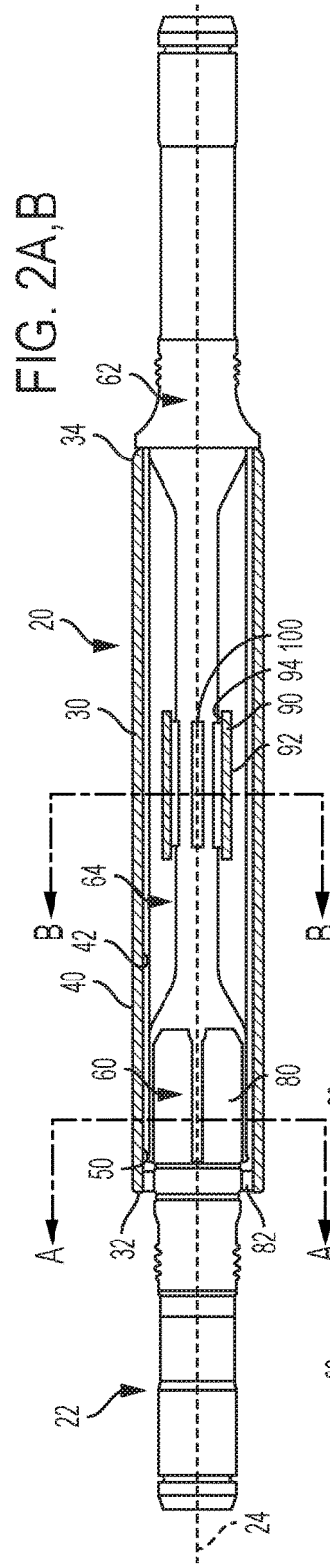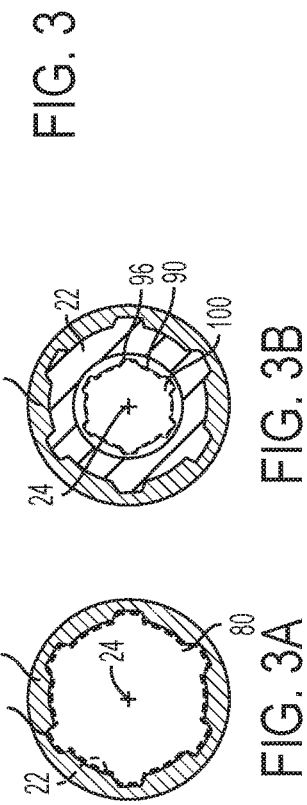

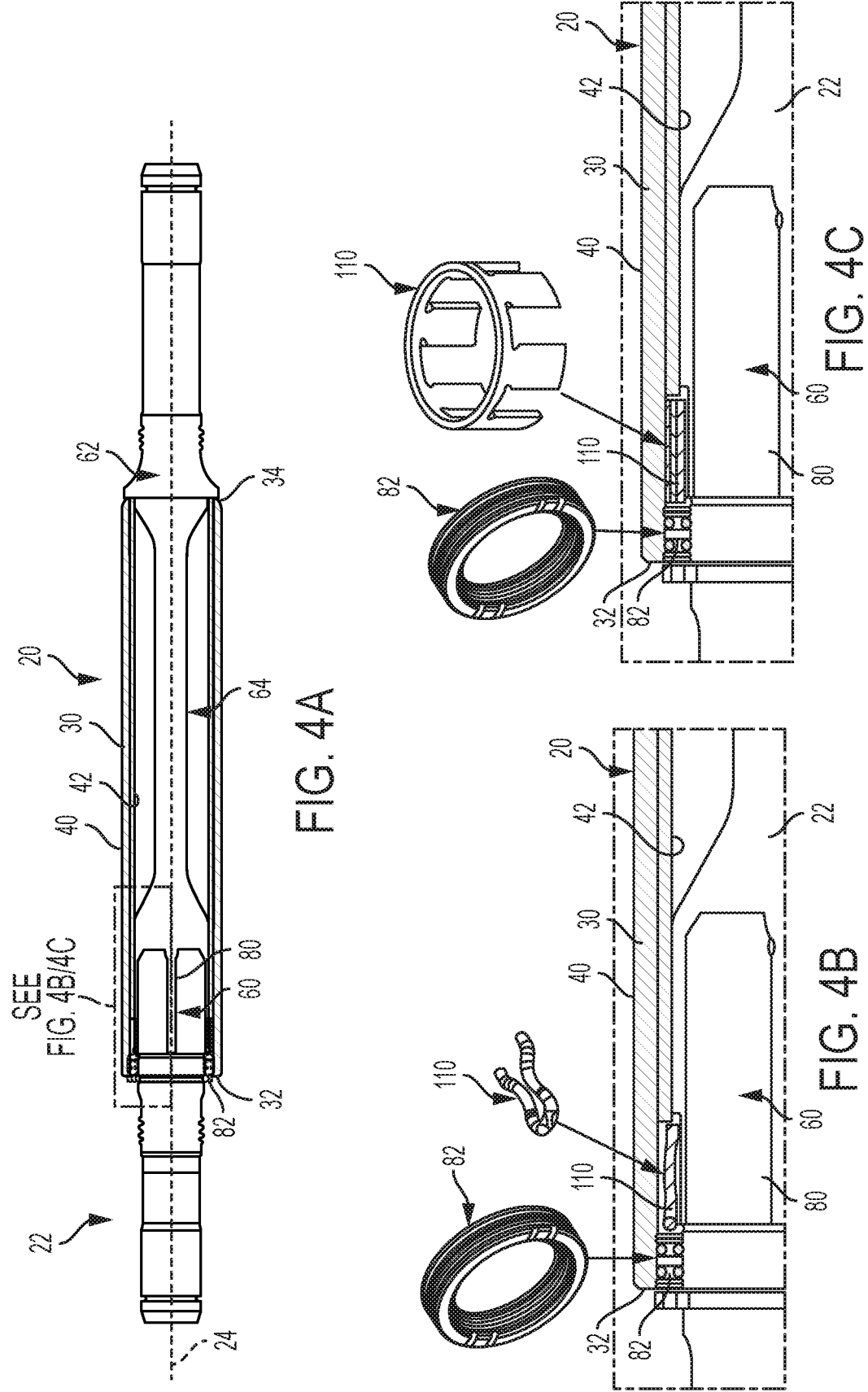

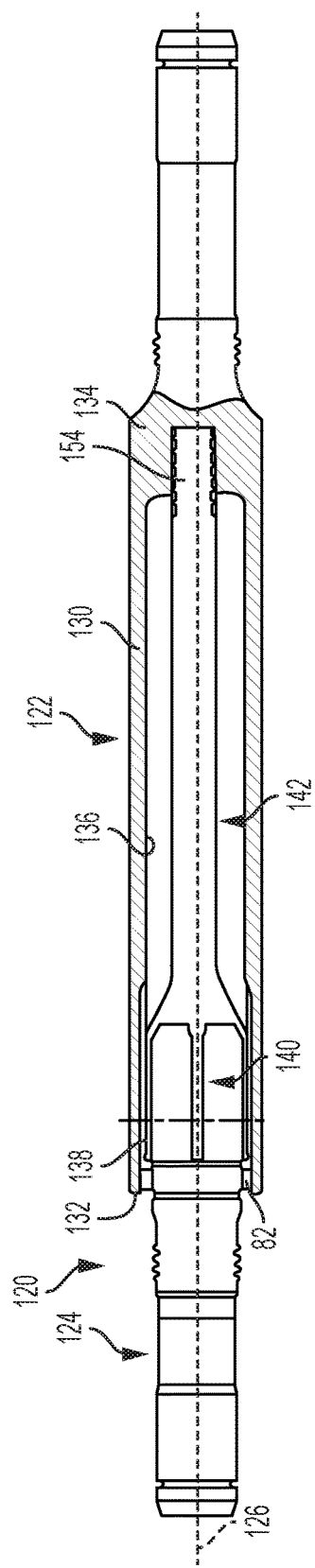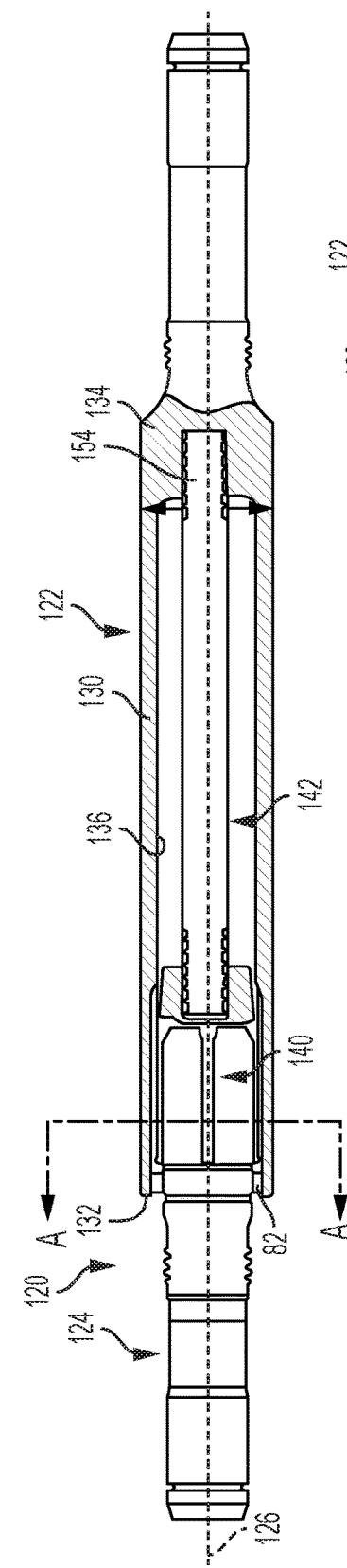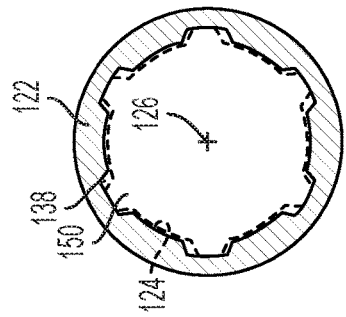

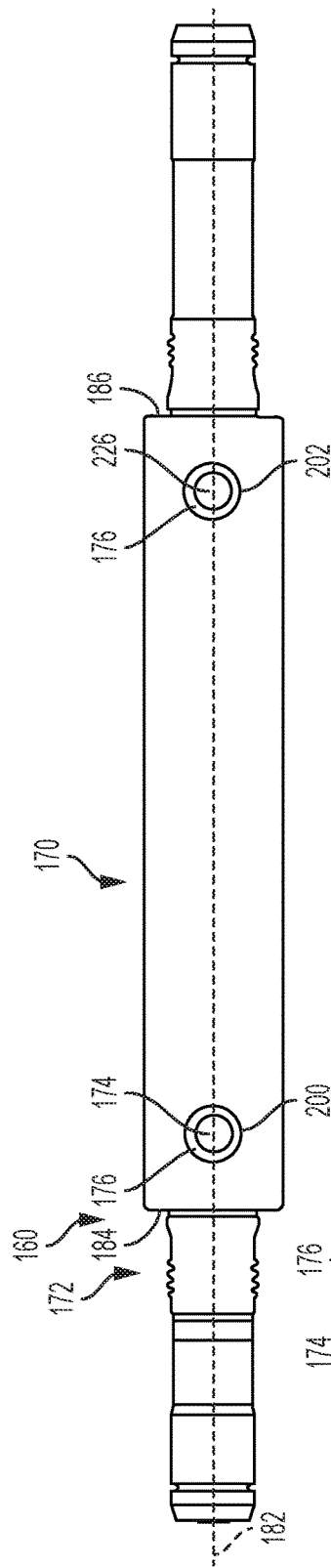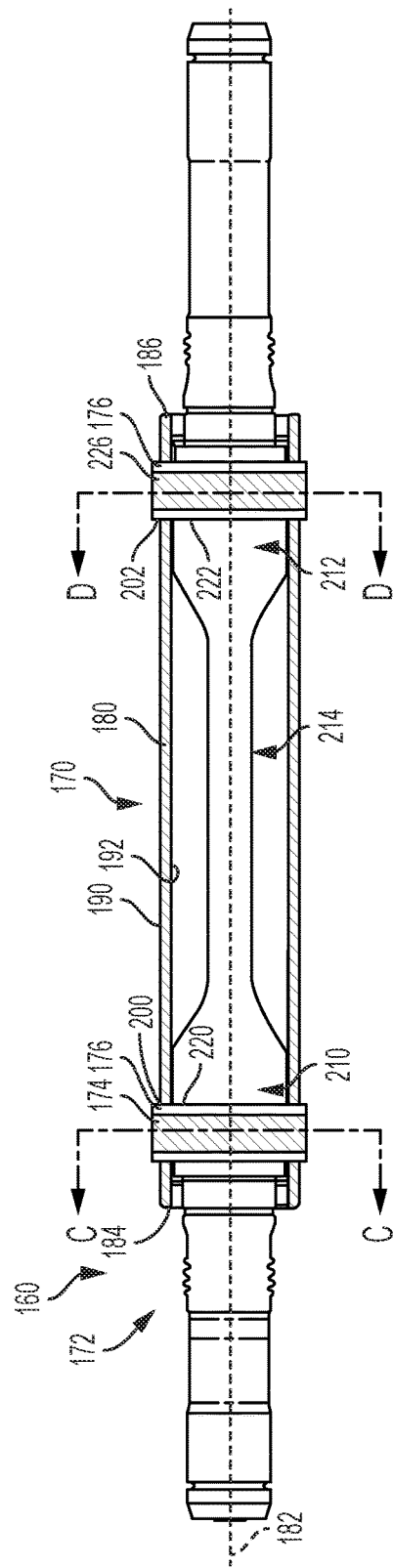

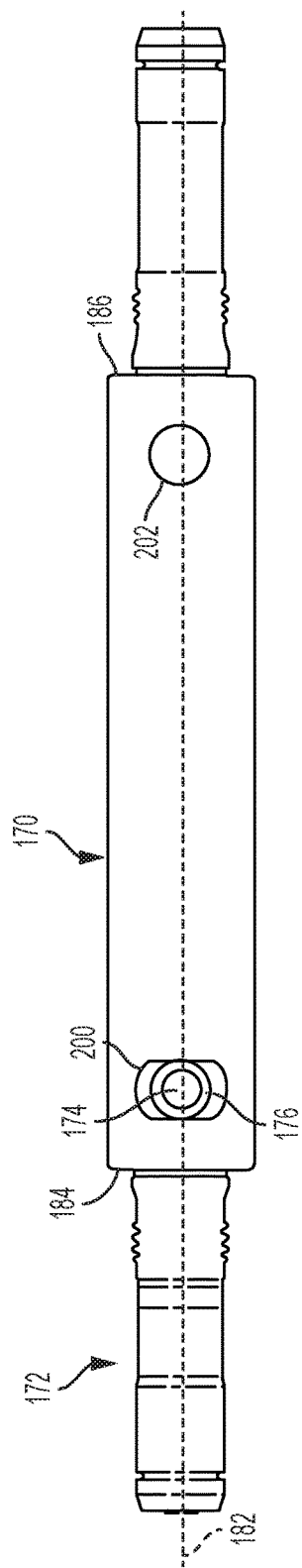
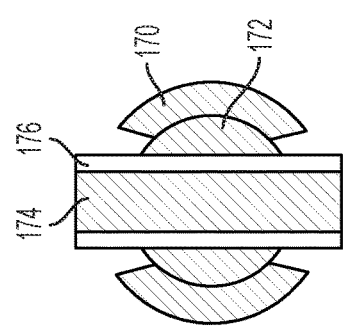
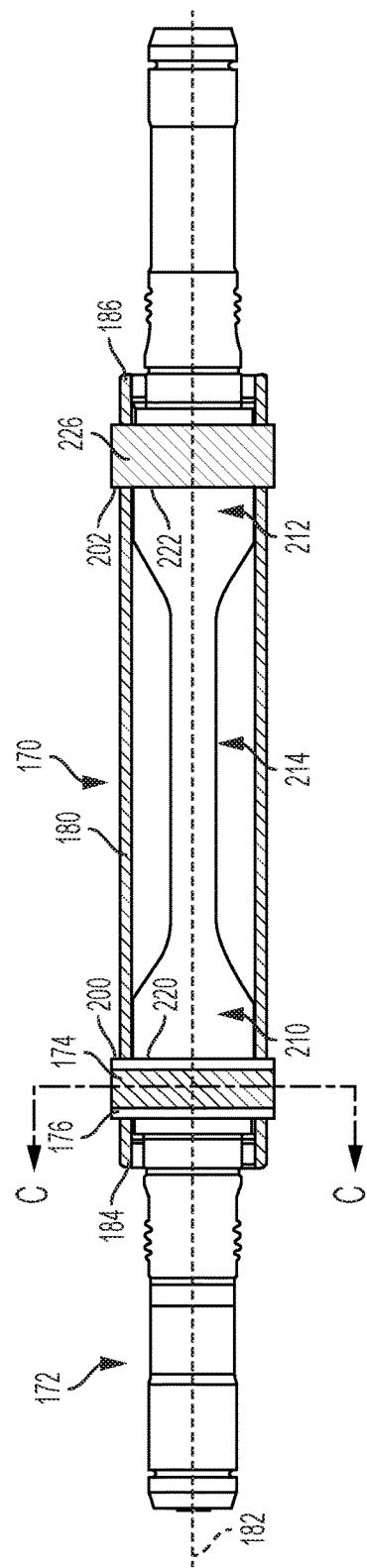
FIG. 8A
FIG. 8C
FIG. 8B

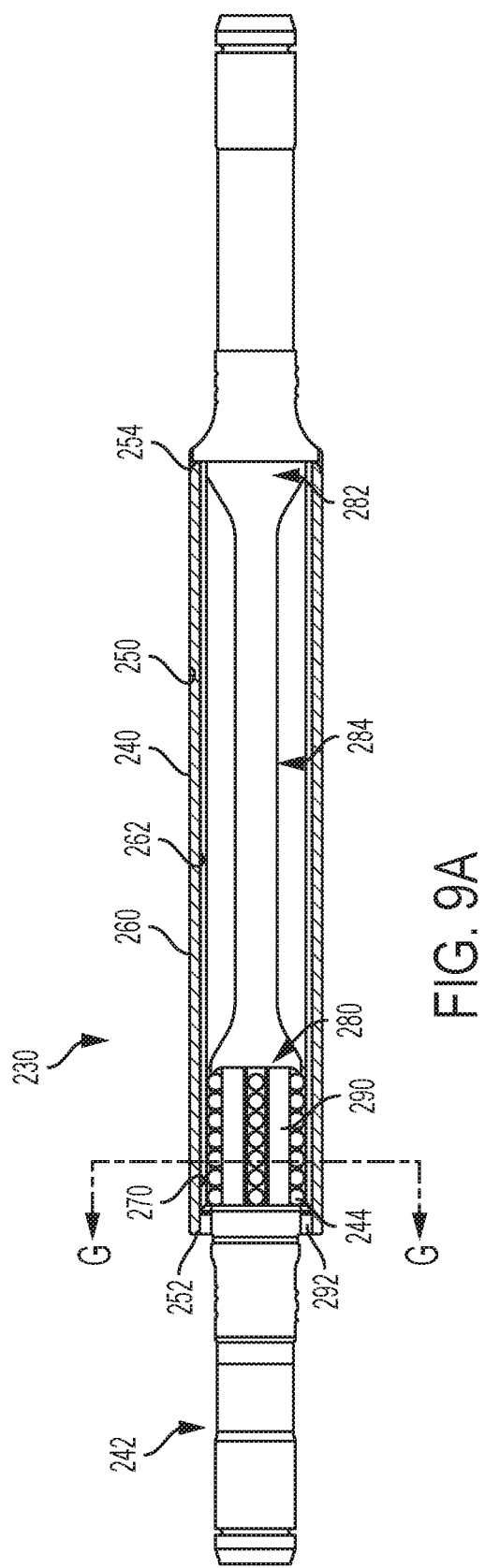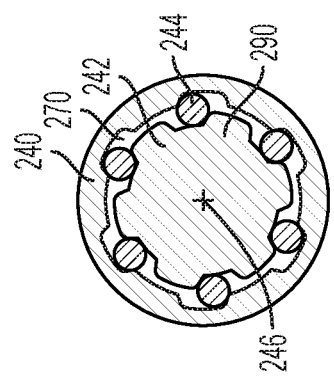

TORQUE TRANSMITTING SHAFT

CROSS-REFERENCES TO RELATED APPLICATIONS

This patent application is a divisional application of U.S. application Ser. No. 14/933,639, filed Nov. 5, 2015, now U.S. Pat. No. 9,945,415, that claims priority to U.S. Provisional Patent Application Ser. No. 62/075,498, filed Nov. 5, 2014, both of which are incorporated herein by reference in their entirety.

BACKGROUND OF THE INVENTION

The present invention relates to a torque transmitting shaft having multiple torsional stiffness rates.

Vehicle drive lines transmit torque or power from a drive source, such as an internal combustion engine, to vehicle wheels. The torque or power may be transmitted through a series of driveline components such as gears, joints, and shafts. The driveline components provide a level of torsional stiffness to satisfy performance requirements. The driveline components also provide a level of compliance to reduce unwanted noise, vibration, or harshness. Some vehicle drive lines include driveshafts that are a simple one-piece torque transmitting shaft having a single torsional stiffness rate.

SUMMARY OF THE INVENTION

In one embodiment of the present invention, a torque transmitting shaft is provided. The torque transmitting shaft includes a first member and a second member. The first member extends along an axis and has an inner surface extending between a first end and a second end. The inner surface defines a plurality of first engagement elements disposed proximate the first end. The second member extends along the axis and is received within the first member. The second member includes a first end portion, a second end portion, and an intermediate portion extending between the first end portion and a second end portion. The first end portion has a first spline portion and each member of the first spline portion is received within the corresponding engagement elements of the plurality of first engagement elements. A first torsional stiffness rate is provided by the second member while a first torque is applied to the second member and while there is a tangential clearance between a member of the first spline portion and an engagement element of the plurality of first engagement elements. A second torsional stiffness rate is provided by at least one of the first member and the second member while a second torque is applied to the second member and while there is no tangential clearance between the member of the first spline portion and the engagement element of the plurality of the first engagement elements.

In another embodiment of the present invention, a torque transmitting shaft is provided. The torque transmitting shaft includes a first member extending along an axis, a second member extending along the axis and received within the first member, and a first pin. The first member has a generally cylindrical body extending between a first end and a second end. The first end has a first opening extending substantially perpendicular to the axis and the second end has a second opening extending substantially perpendicular to the axis and spaced apart from the first opening. The second member has a first end portion, a second end portion, and an intermediate portion extending between the first end portion and the second end portion. The first end portion has a first end portion opening extending substantially perpendicular to the axis and the second end portion has a second end portion opening extending substantially perpendicular to the axis. The first pin is received within the first opening and the first end portioning opening. A first torsional stiffness rate is provided by the second member while the first torque is applied to the second member and while there is a tangential clearance between an exterior surface of the first pin and an edge of the first opening. A second torsional stiffness rate is provided by at least one of the first member and the second member while a second torque is applied to the second member and while there is no tangential clearance between the exterior surface of the first pin and the edge of the first opening.

In yet another embodiment of the present invention, a torque transmitting shaft is provided. The torque transmitting shaft includes a first member and a second member. The first member extends along an axis and has an inner surface extending between a first end and a second end. The inner surface defines a plurality of first engagement elements disposed proximate the first end. The second member extends along the second axis and has a first end portion and an intermediate portion extending from the first end portion. An end of the intermediate portion is fixedly attached to the second end. The first end portion has a first spline portion and each member of the first spline portion is received within corresponding engagement elements of the plurality of first engagement elements.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 1A-1B are perspective views of a first embodiment of a torque transmitting shaft;

FIG. 1C is a cross-section view through C-C of FIG. 1A;

FIG. 2 is a partial section view of a second embodiment of a torque transmitting shaft;

FIGS. 2A and 2B are cross-section views through A-A and B-B of FIG. 2, respectively;

FIG. 3 is a partial section view of a third embodiment of a torque transmitting shaft;

FIGS. 3A and 3B are cross-section views through A-A and B-B of FIG. 3, respectively;

FIGS. 4A-4C are perspective views of a fourth embodiment of a torque transmitting shaft;

FIG. 5 is a partial section view of a fifth embodiment of a torque transmitting shaft;

FIG. 6 is a partial section view of a sixth embodiment of a torque transmitting shaft;

FIG. 6A is a cross-section view through A-A of FIG. 6;

FIGS. 7A and 7B are perspective views of a seventh embodiment of a torque transmitting shaft;

FIGS. 7C and 7D are cross-section views through C-C and D-D of FIG. 7B, respectively;

FIGS. 8A and 8B are perspective views of an eighth embodiment of a torque transmitting shaft;

FIG. 8C is a cross-section view through C-C of FIG. 8B; and

FIGS. 9A-9C are views of a ninth embodiment of a torque transmitting shaft.

DETAILED DESCRIPTION

Figure 1D:
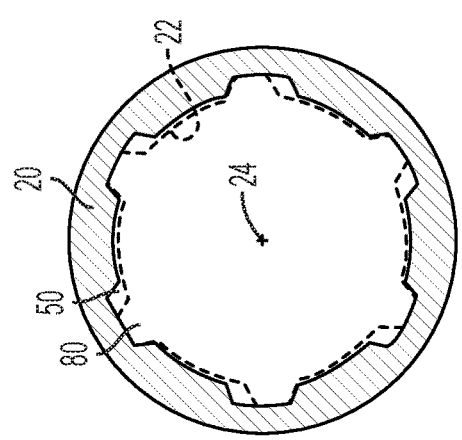
FIG. 1D is a cross-section view through D-D of FIG. 1A.

Referring now to the Figures, where the invention will be described with reference to specific embodiments, without limiting same, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Torque transmitting shafts are used to transmit torque or power from a transmission or transaxle to a vehicle wheel. FIGS. 1A-1C illustrates a first embodiment of a torque transmitting shaft 10. The torque transmitting shaft 10 includes a first member 20 and a second member 22. The first member 20 extends along an axis 24. The first member 20 includes a body 30 extending between a first end 32 and a second end 34 disposed opposite the first end 32. The body 30 is a generally cylindrical body having an exterior surface 40 and an inner surface 42.

The inner surface 42 defines an inner bore of the first member 20. The inner surface 42 defines a plurality of first engagement elements 50. The plurality of first engagement elements 50 are disposed proximate the first end 32. In the second embodiment of the torque transmitting shaft illustrated in FIGS. 2, and 2A,B, the inner surface 42 defines a plurality of second engagement elements 52. The plurality of second engagement elements 52 are disposed proximate the second end 34.

The second member 22 extends along the axis 24. The second member 22 is received within the first member 20. The second member 22 has a first end portion 60, a second end portion 62 disposed opposite the first end portion 60, and an intermediate portion 64. The intermediate portion 64 extends between the first end portion 60 and the second end portion 62.

The first end portion 60 has a first end portion diameter. The second end portion 62 has a second end portion diameter. The intermediate portion 64 has an intermediate portion diameter. The intermediate portion diameter is less than the first end portion diameter and the second end portion diameter such that the second member 22 has a dog bone shape when viewed from the side.

Figure 1E:
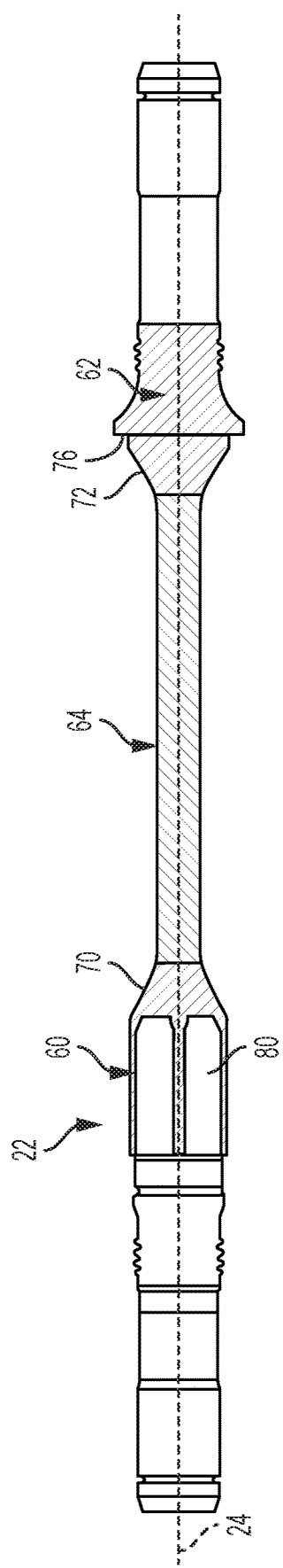
FIG. 1E is a cross-sectional view of FIG. 1B.

In some embodiments, the first end portion 60, the second end portion 62, and the intermediate portion 64 are of a one-piece construction made of the same material. In other embodiments, the first end portion 60, the second end portion 62, and the intermediate portion 64 are provided as separate components that are joined together by a variety of methods. The intermediate portion 64 is made of a first material and the first end portion 60 and the second end portion 62 are made of a second material different from the first material, as shown in FIG. 1E. For example, the first end portion 60 and the second end portion 62 may be made of steel while the intermediate portion 64 is made of aluminum.

The intermediate portion 64 has a first transition region 70 and a second transition region 72. The first transition region 70 extends from a first end of the intermediate portion 64 towards the first end portion 60. The first transition region 70 provides a gradual transition from the smaller intermediate portion diameter to the larger first end portion diameter. The diameter of the first transition region 70 increases from the first end of the intermediate portion 64 towards the first end portion 60.

The second transition region 72 extends from a second end of the intermediate portion 64 towards the second end portion 62. The second transition region 72 provides a gradual transition from the smaller intermediate portion diameter to the larger second end portion diameter. The diameter of the second transition region 72 increases from the second end of the intermediate portion 64 towards the second end portion 62. The second transition region 72 abuts a flanged surface 76 of the second end portion 62.

The first end portion 60 is configured to be rotatable relative to the first member 20. The first end portion 60 is rotatable relative to the first end 32 of the first member 20 while a torque is applied to the second member 22.

The first end portion 60 has a first spline portion 80. The first spline portion 80 is disposed between the first transition region 70 and an end of the first end portion 60. The first spline portion 80 is configured as a plurality of torque transmitting grooves, torque transmitting serrations, gear teeth, or the like. Each member of the first spline portion 80 is received within or between corresponding first engagement elements of the plurality of first engagement elements 50.

In at least one embodiment, a first sealing member 82 is provided. The first sealing member 82 is disposed proximate the first end 32 of the first member 20. The first sealing member 82 engages the first end 32 of the first member 20 and a portion of the first end portion 60 of the second member 22. The first sealing member 82 is configured to inhibit foreign objects or particles from entering the inner bore of the first member 20. The first sealing member 82 inhibits or prevents contaminants from intruding the plurality of first engagement elements 50 and the first spline portion 80. The first sealing member 82 is configured as a friction washer.

The second end portion 62 is fixedly positioned relative to the first member 20. The second end portion 62 is fixedly positioned relative to the second end 34 of the first member 20 while an input torque is applied to the second member 22. The second end 34 of the first member 20 is fixed to the flanged surface 76 of the second end portion 62. The second end 34 is joined to the second end portion 62. The second end 34 is joined to the second end portion 62 by a variety of methods such as welding, press fit, swaging, fasteners, brazing, a pin extending from at least one of an end surface of the second end 34 or the flanged surface 76 of the second end portion 62 that is received within an opening defined by at least one of the end surface of the second end 34 or the flanged surface 76 of the second end portion 62.

In the second embodiment of the torque transmitting shaft illustrated in FIG. 2, the second end portion 62 is configured to be rotatable relative to the first member 20. The second end portion 62 is rotatable relative to the second end 34 of the first member 20 while an input torque is applied to the second member 22.

The second end portion 62 has a second spline portion 84. The second spline portion 84 is disposed between the second transition region 72 and an end of the second end portion 62. The second spline portion 84 is configured as a plurality of torque transmitting grooves, torque transmitting serrations, gear teeth, or the like. Each member of the second spline portion 84 is received within or between corresponding second engagement elements of the plurality of second engagement elements 52.

A second sealing member 86 is provided. The second sealing member 86 is disposed proximate the second end 34 of the first member 20. The second sealing member 86 engages the second end 34 of the first member 20 and a portion of the second end portion 62 of the second member 22. The second sealing member 86 is configured to inhibit foreign objects or particles from entering the inner bore of the first member 20. The second sealing member 86 inhibits or prevents contaminants from intruding the plurality of second engagement elements 52 and the second spline portion 84. The second sealing member 86 is configured as a friction washer.

The torque transmitting shaft 10 is configured to provide multiple torsional stiffness rates while a torque is applied to the second member 22. The multiple torsional stiffness rates are based on geometry and material characteristics of the second member 22 and a tangential clearance that exists between the plurality of first engagement elements 50 and the first spline portion 80 and/or the plurality of second engagement elements 52 and the second spline portion 84.

A first torsional stiffness rate is provided by at least one of the first member 20 and the second member 22. The first torsional stiffness rate is provided while a first torque is applied to the second member 22 and while there is a tangential clearance between a member of the first spline portion 80 and an engagement element of the plurality of first engagement elements 50, as shown in FIG. 1C.

A second torsional stiffness rate is provided by at least one of the first member 20 and the second member 22. The second torsional stiffness rate is provided while a second torque, greater than the first torque, is applied to the second member 22 and while there is no tangential clearance between the member of the first spline portion 80 and the engagement element of the plurality of first engagement elements 50, as shown in FIG. 1D. The second torsional stiffness rate is greater than the first torsional stiffness rate.

Multiple other torsional stiffness rates may be provided by at least one of the first member 20 and the second member 22. A subsequent torsional stiffness rate, also referred to as third torsional stiffness rate, is provide while a third torque is applied to the second member 22 and while there is a tangential clearance between a member of the second spline portion 84 and an engagement element of the plurality of second engagement elements 52. Another torsional stiffness rate, also referred to as fourth torsional stiffness rate, is provided while a fourth torque is applied to the second member 22 and while there is no tangential clearance between a member of the second spline portion 84 and the engagement element of the plurality of second engagement elements 52. The fourth torsional stiffness rate is greater than the subsequent, third torsional stiffness rate.

In some embodiments, a lubricant 88 is applied to at least one of the plurality of first engagement elements 50 and the first spline portion 80. The lubricant 88 is applied to at least one of the plurality of second engagement elements 52 and the second spline portion 84. The application of the lubricant 88 inhibits or reduces squeaking or noise, vibration, or harshness due to the engagement between the plurality of first engagement elements 50 and the first spline portion 80 and/or the plurality of second engagement elements 52 and the second spline portion 84.

FIG. 3 illustrates a third embodiment of the torque transmitting shaft. The torque transmitting shaft includes an intermediate part 90. The intermediate part 90 includes an outer surface 92 and an interior surface 94. The outer surface 92 engages the inner surface 42 of the first member 20. The interior surface 94 defines a plurality of intermediate engagement elements 96. The intermediate engagement elements 96 are configured to receive a member of an intermediate spline portion 100 of the intermediate portion 64. The intermediate spline portion 100 is disposed between the first spline portion 80 and the second spline portion 84. The intermediate spline portion 100 is configured as a plurality of torque transmitting grooves, torque transmitting serrations, gear teeth, or the like.

The intermediate part 90 is rotatable relative to the second member 22. Each member of the intermediate spline portion 100 is received within corresponding engagement elements of the plurality of intermediate engagement elements 96.

Intermediate part 90 is made of a material different than the first member 20 and the second member 22. The intermediate part 90 is made of material that is more compliant than the first member 20 and the second member 22. The intermediate part 90 is configured to provide damping during engagement of a member of the intermediate spline portion 100 and an element of the plurality of intermediate engagement elements 96.

A third torsional stiffness rate is provided by at least one of the first member 20, the second member 22, and the intermediate part 90. The third torsional stiffness rate is provided while a third torque is applied to the second member 22 and while there is a tangential clearance between a member of the intermediate spline portion 100 and the plurality of first engagement elements 50 and while there is no tangential clearance between a member of the intermediate spline portion 100 and an engagement element of the plurality of intermediate engagement elements 96.

A fourth torsional stiffness rate is provided by at least one of the first member 20, the second member 22, and the intermediate part 90. The fourth torsional stiffness rate is provided while a fourth torque is applied to the second member 22 and while there is a tangential clearance between the member of the intermediate spline portion 100 and the engagement element of the plurality of intermediate engagement elements 96. The third torsional stiffness rate is greater than the fourth torsional stiffness rate.

FIGS. 4A-4C illustrates a fourth embodiment of the torque transmitting shaft. The fourth embodiment includes an engagement part 110. The engagement part 110 is a compressible member configured as a spring or an elastomeric damper. The engagement part 110 is disposed between the first sealing member 82 and a portion of the first spline portion 80. In at least one embodiment, the engagement part 110 is disposed between the second sealing member 86 and a portion of the second spline portion 84.

The engagement part 110 is disposed between adjacent elements of the plurality of first engagement elements 50. The engagement part 110 is disposed between a member of the first spline portion 80 and an element of the plurality of first engagement elements 50. The engagement part 110 is molded or injected between the first spline portion 80 and the plurality of first engagement elements 50. In response to rotation of the first end portion 60 of the second member 22 relative to the first end 32 of the first member 20 at least one of an element of the plurality of the first engagement elements 50 and a member of the first spline portion 80 at least partially compresses the engagement part 110 to vary the torsional stiffness rate of the torque transmitting shaft 10.

A fifth torsional stiffness rate is provided by at least one of the first member 20, the second member 22, and the engagement part 110. The fifth torsional stiffness rate is provided while a fifth torque is applied to the second member 22 and while a member of the first spline portion 80 at least partially compresses the engagement part 110 between a member of the first spline portion 80 and an element of the plurality of first engagement elements 50.

A sixth torsional stiffness rate is provided by at least one of the first member 20, the second member 22 and the engagement part 110. The sixth torsional stiffness rate is provided while a sixth torque, greater than the fifth torque, is applied to the second member 22 and while the engagement part 110 is either completely compressed or the member of the first spline portion 80 engages the element of the plurality of first engagement elements 50. The sixth torsional stiffness rate is greater than the fifth torsional stiffness rate. The sixth torsional stiffness rate may be approximately equal to the second torsional stiffness rate.

FIG. 5 illustrates a fifth embodiment of the torque transmitting shaft. The torque transmitting shaft 120 includes a first member 122 and a second member 124. The first member 122 has a generally cylindrical body 130 extending along an axis 126 between a first end 132 and a second end 134. The generally cylindrical body 130 has an inner surface 136.

The inner surface 136 defines an inner bore of the first member 122. The inner bore extends from the first end 132 towards the second end 134. The first end 132 defines an opening and the second end 134 is closed and does not define an opening. The second end 134 defines a closed end surface. The inner surface 136 defines a plurality of engagement elements 138 disposed proximate the first end 132.

The second member 124 extends along the axis 126. The second member 124 is received within the first member 122. The second member 124 has a first end portion 140 and an intermediate portion 142. The first end portion 140 is configured to be rotatable relative to the first member 122. The first end portion 140 is rotatable relative to the first end 132 of the first member 122 while an input torque is applied to the second member 124.

The first end portion 140 has a spline portion 150. The spline portion 150 is configured as a plurality of torque transmitting grooves, torque transmitting serrations, gear teeth, or the like. Each member of the spline portion 150 is received within or between corresponding first engagement elements of the plurality of engagement elements 138.

The intermediate portion 142 extends from the first end portion 140 along the axis 126. The intermediate portion 142 includes an end 154 disposed opposite the first end portion 140. The end 154 of the intermediate portion 142 is fixedly attached to the second end 134 of the first member 122. The end 154 is fixedly attached to the closed end surface of the second end 134 by press fitting, swaging, solid-state joining, or the like.

The torque transmitting shaft 120 is configured to provide multiple torsional stiffness rates while a torque is applied to the second member 124. A first torsional stiffness rate is provided by the first member 122. The first torsional stiffness rate is provided by the first member 122 while a first torque is applied to the first member 122 and while there is a tangential clearance between a member of the spline portion 150 and an engagement element of the plurality of engagement elements 138.

A second torsional stiffness rate is provided by at least one of the first member 122 and the second member 124. The second torsional stiffness rate is provided by at least one of the first member 122 and the second member 124 while a second torque is applied to the first member 122 and while there is no tangential clearance between the member of the spline portion 150 and the engagement element of the plurality of engagement elements 138. The second torsional stiffness rate is greater than the first torsional stiffness rate.

The fifth embodiment of the torque transmitting shaft illustrated in FIG. 5, the first end portion 140 and the intermediate portion 142 are of a one-piece construction. The sixth embodiment of the torque transmitting shaft illustrated in FIGS. 6 and 6A, the first end portion 140 and the intermediate portion 142 are provided as separate components that are joined together by a variety of solid-state joining methods.

A seventh embodiment of a torque transmitting shaft is illustrated in FIGS. 7A-7D. The torque transmitting shaft 160 includes a first member 170, a second member 172, a first pin 174, and a bushing 176.

The first member 170 includes a generally cylindrical body 180 extending along an axis 182 between a first end 184 and a second end 186. The generally cylindrical body 180 has an exterior surface 190 and an inner surface 192. The inner surface 192 defines an inner bore of the first member 170.

The generally cylindrical body 180 defines a first opening 200 and a second opening 202 spaced apart from the first opening 200. The first opening 200 is disposed proximate the first end 184. The first opening 200 extends from the exterior surface 190 to the inner surface 192 along an opening axis disposed substantially perpendicular to the axis 182. The first opening 200 extends completely through the generally cylindrical body 180. In the eighth embodiment of the torque transmitting shaft illustrated in FIGS. 8A-8C the first opening 200 is larger than the second opening 202. The first opening 200 is a slotted opening having a width that extends transverse to the axis 182 greater than a diameter of the second opening 202.

The second opening 202 is disposed proximate the second end 186. The second opening 202 extends from the exterior surface 190 to the inner surface 192 along another opening axis disposed substantially perpendicular to the axis 182. The second opening 202 extends completely through the generally cylindrical body 180.

The second member 172 extends along the axis 182. The second member 172 is received within the first member 170. The second member 172 has a first end portion 210, a second end portion 212, and an intermediate portion 214. The intermediate portion 214 extends between the first end portion 210 and the second end portion 212.

The first end portion 210 has a first end portion diameter. The second end portion 212 has a second end portion diameter. The intermediate portion 214 has an intermediate portion diameter. The intermediate portion diameter is less than the first end portion diameter and is less than the second end portion diameter such that the second member 172 has a dog bone shape when viewed from the side.

The first end portion 210 defines a first end portion opening 220. The first end portion opening 220 extends completely through the first end portion 210 along an axis disposed substantially perpendicular to the axis 182. The first end portion opening 220 is proximately aligned with the first opening 200.

The second end portion 212 defines a second end portion opening 222. The second end portion opening 222 extends completely through the second end portion 212 along an axis disposed substantially perpendicular to the axis 182. The second end portion opening 222 is proximately aligned with the second opening 202.

The first opening 200 and the first end portion opening 220 are sized to receive at least one of the first pin 174 and the bushing 176. A first torsional stiffness rate is provided by at least one of the first member 170 and the second member 172. The first torsional stiffness rate is provided while a first torque is applied to the second member 172 and while there is a tangential clearance between an exterior surface of the first pin 174 and an edge of the first opening 200.

A second torsional stiffness rate is provided by at least one of the first member 170, the second member 172, and the bushing 176. The second torsional stiffness rate is provided while a second torque, greater than the first torque, is applied to the second member and while there is no tangential clearance between the exterior surfaces of the first pin 174 and the edge of the first opening 200.

A third torsional stiffness rate is provided by at least one of the first member 170, the second member 172, and the bushing 176. The third torsional stiffness rate is provided while a third torque is applied to the second member 172 and while the first pin 174 at least partially compresses the bushing 176.

The second opening 202 and the second end portion opening 222 are sized to receive at least one of a second pin 226 and the bushing 176. A fourth torsional stiffness rate is provided by at least one of the first member 170 and the second member 172. The fourth torsional stiffness rate is provided while a fourth torque is applied to the second member 172 and while there is a tangential clearance between an exterior surface of the second pin 226 and an edge of the second opening 202.

A fifth torsional stiffness rate is provided by at least one of the first member 170, the second member 172, and the bushing 176. The fifth torsional stiffness rate is provided while a fifth torque, greater than the fourth torque, is applied to the second member and while there is no tangential clearance between the exterior surfaces of the second pin 226 and the edge of the second opening 202.

A sixth torsional stiffness rate is provided by at least one of the first member 170, the second member 172, and the bushing 176. The sixth torsional stiffness rate is provided while a sixth torque is applied to the second member 172 and while the second pin 226 at least partially compresses the bushing 176.

In the seventh embodiment illustrated in FIGS. 7A-7D, the first opening 200 and the first end portion opening 220 receive the first pin 174 and the bushing 176 and the second opening 202 and the second end portion opening 222 receive the second pin 226 and the bushing 176, the first end portion 210 and the second end portion of 212 are rotatable relative to each other. The first end portion 210 is rotatable relative to the first end 184 of the first member 170. The second end portion 212 is rotatable relative to the second end 186 of the first member 170.

In the eighth embodiment illustrated in FIGS. 8A-8C, the first opening 200 and the first end portion opening 220 receive the first pin 174 and the bushing 176 and the second opening 202 and the second end portion opening 222 receive the second pin 226, the first end portion 210 is configured to be rotatable and the second end portion 212 is fixedly positioned. The first end portion 210 is rotatable relative to the first end 184 of the first member 170. The second end portion 212 is fixedly positioned relative to the second end 186 of the first member 170.

FIGS. 9A-9C illustrates a ninth embodiment of a torque transmitting shaft 230. The torque transmitting shaft 230 includes a first member 240, a second member 242, and a plurality of engaging rolling elements 244. The first member 240 extends along an axis 246. The first member 240 includes a body 250 extending between a first end 252 and a second end 254 disposed opposite the first end 252. The body 250 is a generally cylindrical body having an exterior surface 260 and an inner surface 262.

The inner surface 262 defines an inner bore of the first member 240. The inner surface 262 defines a plurality of first engagement elements 270. The plurality of first engagement elements 270 are disposed proximate the first end 252.

The second member 242 extends along the axis 246. The second member 242 is received within the first member 240. The second member 242 has a first end portion 280, a second end portion 282 disposed opposite the first end portion 280, and an intermediate portion 284. The intermediate portion 284 extends between the first end portion 280 and the second end portion 282.

The first end portion 280 has a first end portion diameter. The second end portion 282 has a second end portion diameter. The intermediate portion 284 has an intermediate portion diameter. The intermediate portion diameter is less than the first end portion diameter and the second end portion diameter such that the second member 242 has a dog bone shape when viewed from the side.

The first end portion 280 is configured to be rotatable relative to the first member 240. The first end portion 280 is rotatable relative to the first end 252 of the first member 240 while a torque is applied to the second member 242.

The first end portion 280 has a first spline portion 290. The first spline portion 290 is disposed proximate the first end 252 of the first member 240. The first spline portion 290 is configured as a plurality of torque transmitting grooves, torque transmitting serrations, gear teeth, or the like. Each member of the first spline portion 290 is received within or between corresponding first engagement elements of the plurality of first engagement elements 270.

In at least one embodiment, a first sealing member 292 is provided. The first sealing member 292 is disposed proximate the first end 252 of the first member 240. The first sealing member 292 engages the first end 252 of the first member 240 and a portion of the first end portion 280 of the second member 242. The first sealing member 292 is configured to inhibit foreign objects or particles from entering the inner bore of the first member 240. The first sealing member 292 inhibits or prevents contaminants from intruding the plurality of first engagement elements 270 and the first spline portion 290. The first sealing member 292 is configured as a friction washer.

The second end portion 282 is fixedly positioned relative to the first member 240. The second end portion 282 is fixedly positioned relative to the second end 254 of the first member 240 while an input torque is applied to the second member 242. The second end 254 of the first member 240 is fixed to the second end portion 282. The second end 254 is joined to the second end portion 282. The second end 254 is joined to the second end portion 282 by a variety of methods such as welding, press fit, swaging, fasteners, brazing, a pin and groove, or the like.

The plurality of engaging rolling elements 244 are disposed between the first member 240 and the second member 242. The plurality of engaging rolling elements 244 are ball members, rolling pins, or the like disposed within a cage. The plurality of engaging rolling elements 244 are disposed between the pluralities of first engagement elements 270 of the first member 240 and the first spline portion 290 of the second member 242.

A first torsional stiffness rate is provided by the second member 242. The first torsional stiffness rate is provided while a first torque is applied to the second member 242 and while there is a tangential clearance between a member of the first spline portion 290, an engagement element of the plurality of first engagement elements 270, and an element of the plurality of engaging rolling elements 244, as shown in FIG. 9B.

A second torsional stiffness rate is provided by at least one of the first member 240 and the second member 242. The second torsional stiffness rate is provided while a second torque, greater than the first torque, is applied to the second member 242 and while there is no tangential clearance between the member of the first spline portion 290, the engagement element of the plurality of first engagement elements 270, and the element of the plurality of engaging rolling elements 244, as shown in FIG. 9C. The second torsional stiffness rate is greater than the first torsional stiffness rate.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torque transmitting shaft comprising:
    a first member extending along an axis, the first member having an inner surface extending between a first end and a second end, the inner surface defining a plurality of first engagement elements disposed proximate the first end;
    a second member extending along the axis and received within the first member, the second member having a first end portion, a second end portion, and an intermediate portion extending between the first end portion and the second end portion, the first end portion having a first spline portion, each member of the first spline portion is received within corresponding engagement elements of the plurality of first engagement elements; and a first torsional stiffness rate is provided by the second member while a first torque is applied to the second member and while there is a tangential clearance between the first spline portion and the plurality of first engagement elements and a second torsional stiffness rate is provided by at least one of the first member and the second member while a second torque is applied to the second member and while there is no tangential clearance between the member of the first spline portion and an engagement element of the plurality of first engagement elements;
    wherein the inner surface defines a plurality of second engagement elements disposed proximate the second end; and
    wherein the second end portion of the second member has a second spline portion, each member of the second spline portion is received within corresponding engagement elements of the plurality of second engagement elements; and a third torsional stiffness rate is provided by the second member while a third torque is applied to the second member and while there is a tangential clearance between the second spline portion and the plurality of second engagement elements and a fourth torsional stiffness rate is provided by at least one of the first member and the second member while a fourth torque is applied to the second member and while there is no tangential clearance between the member of the second spline portion and an engagement element of the plurality of second engagement elements.

2. The torque transmitting shaft of claim 1, wherein the first end portion has a first end portion diameter, the second end portion has a second end portion diameter, and the intermediate portion has an intermediate portion diameter, the intermediate portion diameter being less than the first end portion diameter and the second end portion diameter.

\* \* \* \* \*